July 5, 1960

C. W. KLUG 2,944,209

CONSTANT VOLTAGE OUTPUT DEVICE

Filed Feb. 1, 1950

2 Sheets-Sheet 1

Inventor:
Charles W. Klug.
By: Alois W. Graf
Attorney.

Inventor:
Charles W. Klug.
By: Alois W. Graf
Attorney.

United States Patent Office 2,944,209
Patented July 5, 1960

2,944,209

CONSTANT VOLTAGE OUTPUT DEVICE

Charles W. Klug, Chicago, Ill., assignor, by mesne assignments, to King-Seely Corporation, Ann Arbor, Mich., a corporation of Michigan Filed Feb. 1, 1950, Ser. No. 141,757

4 Claims. (Cl. 323—68)

The present invention relates to a constant voltage output device of the type particularly suited for use with voltage sources which vary appreciably.

In automotive vehicles storage batteries comprise the primary source of power which also have variations in voltage so extensive that even the indicating instruments provided on the dashboard do not accurately indicate the different variable factors being measured. In many instances it would be highly advantageous to have available a constant voltage output. One of these instances is the case of the voltage regulator for the generator which recharges the storage battery. At the present time control devices are provided which include a cut-out, a current coil, and a voltage coil. These various relays have contacts which are opened and closed in order to provide an average control of the generator so as to maintain the battery at a certain level of charge in spite of a variable load demand.

In the case of transceiver installations on automotive vehicles it also would be desirable to have available a constant voltage source so that a more economical transceiver could be employed since it would be unnecessary to make elaborate provisions for compensation of voltage variations in the supply source. Furthermore other instruments such as clocks and the like requiring a constant voltage source can be used whereas heretofore this was not possible.

In accordance with the present invention an electromechanical device is provided utilizing a bi-metallic element for producing an average voltage which is relatively constant as compared to fluctuations in the voltage source or battery.

It is therefore an object of the present invention to provide a device for use with a variable voltage source which will provide a substantially constant voltage output.

It is a further object of the present invention to provide an arrangement employing a constant voltage device which may be modified to cooperate with an improved voltage regulator for automobile generators.

Figure 1:
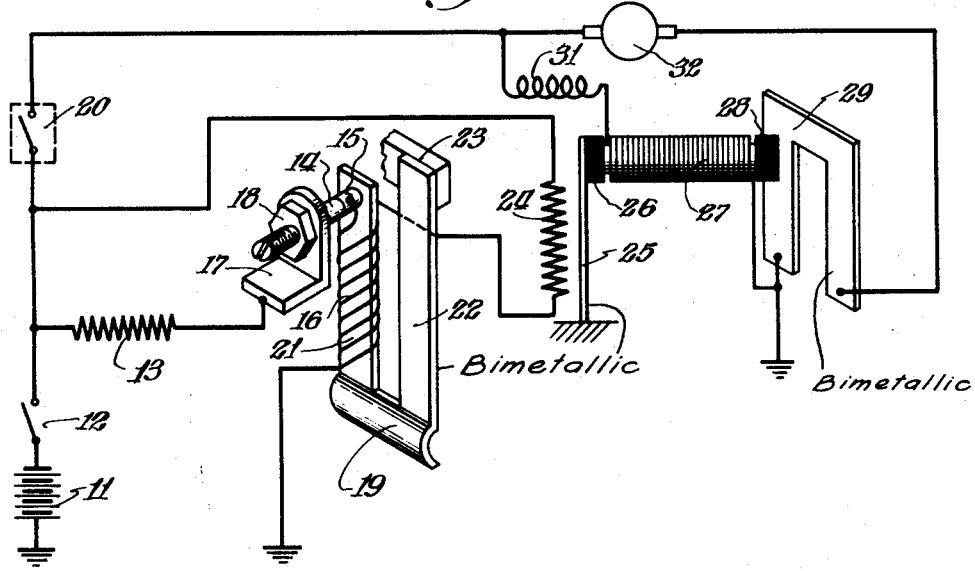
Figure 2:
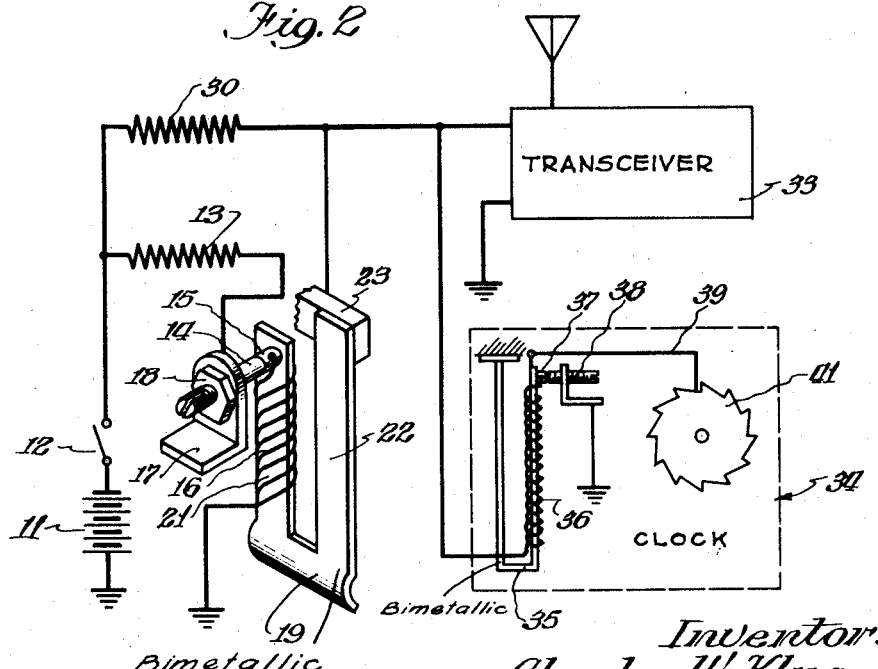
Figure 3:
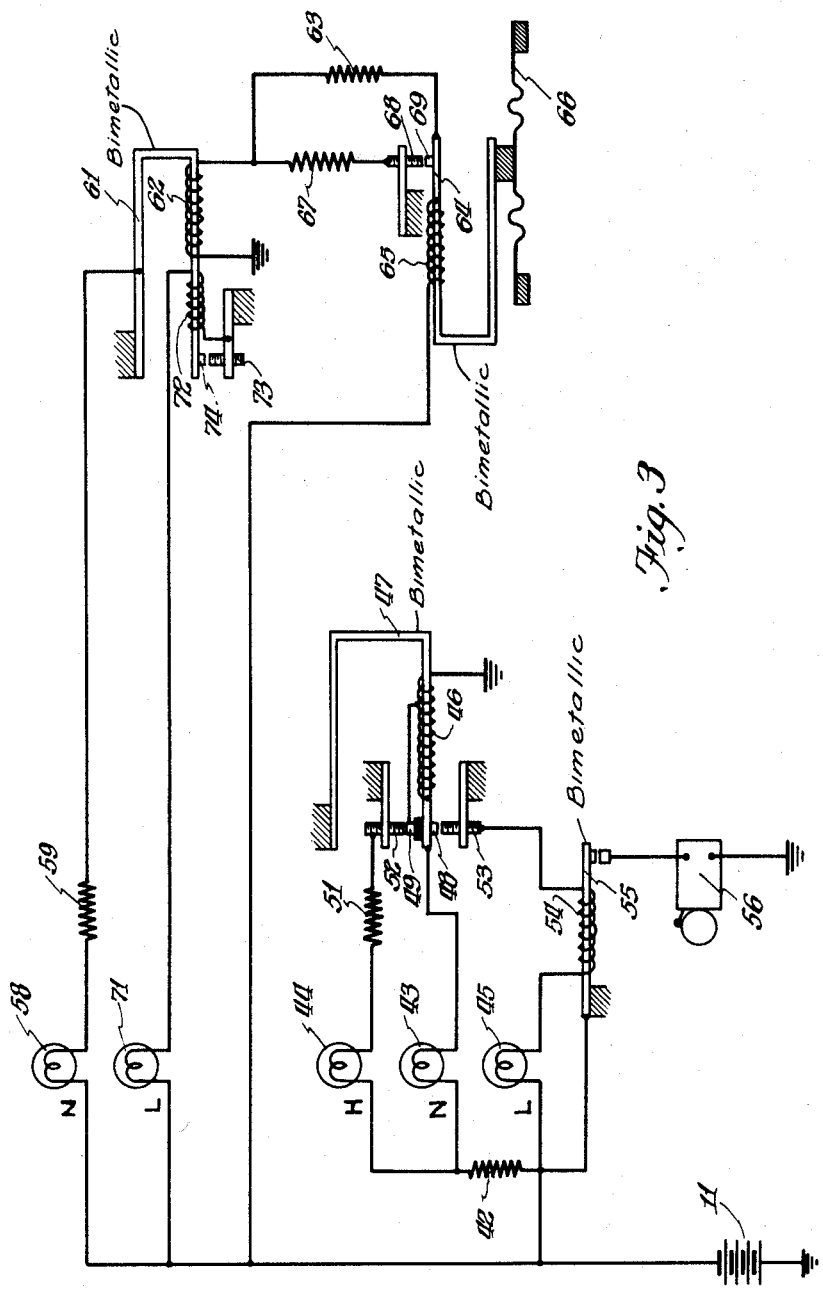

Other and further objects of the present invention will become apparent from the following description taken in connection with the accompanying drawing wherein Figure 1 shows the application of the present invention to a system for regulating the power output of a generator arranged to recharge a storage battery; Figure 2 shows the application of the present invention to an installation where it is desired to obtain a substantially constant voltage source from a storage battery which is subject to fluctuations in voltage; and Figure 3 shows the application of the principles of the present invention to an indication of battery voltage, and another variable factor.

Referring to Figure 1 in the drawing, there is shown a storage battery 11 having one terminal grounded and the other connected to a switch 12. An electric circuit is arranged between the switch 12 and ground to include a resistor 13, a pair of electric contacts 14 and 15 and a heating element 16. The electric contact 14 is carried upon a support bracket 17 and preferably is arranged so as to be adjustable relative thereto by means of a screw and a lock nut 18. The other cooperating contact 15 is carried on a bi-metallic element 19 which has a leg 21 heated by the heating element 16. The other leg 22 provides ambient temperature compensation and this leg is mounted on a suitable support 23. The contact 15 is connected to a heating element 24 having one terminal connected to the switch 12. Current therefore may flow from the battery 11 through the switch 12, the heating element 24, the contact 15, the heating element 16 and back to ground.

The heating element 24 is arranged to heat a bi-metallic element 25 which bears against an insulator 26, pressing against a carbon pile 27. The other end of the carbon pile 27 may also be provided with an insulator 28 which bears against a U-shaped bi-metallic element 29. One terminal of the carbon pile 27 is connected through the field winding 31 to the switch 12 and the battery 11. The armature 32 of the generator is connected between the switch 12 and the U-shaped bi-metallic element 29 which has one of its legs connected to ground. The other end of the carbon pile 27 also is connected to ground.

The resistances of the heaters 24 and 21 and their heating effects are so selected that at normal voltage of a charged battery the bi-metallic element 25 is moved toward the left and the bi-metallic element 16 is moved toward the right. Thus the contacts 14 and 15 will be broken and no current will flow through the resistor 13. The movement of the bi-metallic element 25 toward the left increases the resistance effect of the carbon pile 27, so as to regulate the field current flowing through the field 31 on the generator. The armature current passes through both legs of the bi-metallic element 29 so that it is heated by the charging current. This causes the bi-metallic element to move toward the right thereby to introduce more resistance in the carbon pile 27.

At a low battery voltage the heater 24 will not produce as much heat as at normal battery voltage so that the bi-metallic element 25 will tend to move a short distance toward the right, thereby to reduce the resistance effect of the carbon pile 27. This increases the field voltage thereby to increase the charging rate of the generator. The reduced voltage applied to the heater winding 16 will produce insufficient heating effect to maintain separation of the contact points 14 and 15 with the result that these contacts will close. The closing of the contacts therefore places the resistor 13 in shunt with the heating element 24 thereby to reduce its heating effect and to cause the bi-metallic element 25 to move still more toward the right thereby reducing the resistance effect of the carbon pile 27.

The additional current supplied to the heating element 16 by the closing of the contacts 14 and 15 will cause the bi-metallic element 21 to move so as to separate the contacts. This separation of the contacts is followed by a closing of the contacts at a relatively high intermittent rate since the entire arrangement is so designed as to bring about a maintenance of substantially constant voltage between the contact 15 and ground. It further becomes apparent that the field current flowing through the coil 31 is so regulated in response to both voltage and current as to provide the proper charging rate for the battery 11. The arrangement shown and described has the advantage of being immune to road shock and having no contact points carrying large current which produces pitting and inaccurate operation. The generator cut-out 20 has not been a source of appreciable trouble on such motor cars, but the voltage and current regulator coils and relays, being much more critical in an adjustment, have frequently been the source of trouble.

Referring to Figure 2 it will be seen that many of the same elements employed in Figure 1 may be utilized in a circuit wherein it is desired to obtain an average voltage output which is relatively constant. Accordingly those elements corresponding to the same elements of Figure 1 have been given identical reference characters. From the battery switch 12 there is a circuit extending through the resistor 30 to one leg of the bi-metallic element 19. This circuit is so arranged that the average potential appearing between ground and the right terminal of the resistor 30 is substantially constant. From this terminal conductors extend to a transceiver 33 and to a clock 34. The transceiver 33 represents those cases where a relatively economical transmitting and receiving apparatus is desired. Where it is possible to obtain a substantially constant voltage source it, of course, is appreciated that certain circuit constants of the transceiver 33 can be manufactured more economically. It will be readily appreciated that the transceiver presents a lower load or impedance to the heater element 16 when it is switched from transmit to receive.

So-called electric clocks are frequently standard equipment of automobiles but such clocks are only electrically wound. The arrangement represented by the clock 34 is an electrically driven clock employing a bi-metallic element 35 provided with a heating element 36. One terminal of the heating element 36 is connected to a contact 37 arranged to cooperate with a stationary contact 38 which in turn is connnected to ground. The upper end of one leg of the bi-metallic element 35 has pivotally connnected thereto a dog 39 which engages a ratchet wheel 41. The ratchet wheel 41 drives the remaining gears and hands of a clock. The bi-metallic element 35 having two legs is temperature compensated so that for a constant voltage input the ratchet wheel 41 is driven at a substantially constant speed. The impedance of the clock circuit varies as the contacts 37 and 38 are closed and opened. The varying load requirements of the several instrumentalities is sometimes referred to as a variable impedance load, which is readily accommodated and compensated for by the present invention.

The value of the resistor 30 is so selected as to maintain a certain load relation at a low current rating and a high battery voltage. Thus for a fully charged battery 11, current flows from the switch 12 through the resistor 30 and the heating element 16, which is wound about the leg 21 of the bi-metallic element 19. When, however, the voltage drops below a certain amount insufficient heat is generated by the heater 16 so that the contacts 14 and 15 close. This brings into operation a parallel circuit including the resistor 13. This supplies additional energy to heat the leg 21 so as to bring about a periodic engagement and disengagement of the contacts thereby maintaining a substantially constant voltage between the contact 15 and ground. The resistor 13 is so selected that whenever the voltage between the contact 15 and ground drops below a certain voltage, sufficient additional current is supplied to the heater 16 to bring about a separation of the contacts. This in one sense brings about a modulation of the current flow through the heating element 16 so that the voltage drop thereacross is relatively constant.

When there is no load demand on the battery 11, current will still flow through the resistor 30 and the heating element 16 thereby to hold open the contacts 14 and 15. To further explain the operation of the circuit to produce a constant voltage output it may be said that the circuit including the resistor 30 functions without assistance when the battery is fully charged. The circuit including the resistor 13 functions whenever the battery voltage is below a predetermined value. The bi-metallic element 19 together with its appropriate contact and heater element determines the ratio between voltages which are too high and too low in order to maintain a mean desired voltage between the contact 15 and ground.

If desired the constant voltage output device illustrated in Figure 2 could be enclosed within a hermetically sealed envelope containing an inert gas thereby to increase contact life and eliminate corrosion. It also will be appreciated by those skilled in the art that the voltage regulating device illustrated in Figure 2 may be so modified to increase, decrease or hold constant the voltage output as a function of ambient temperature variation. This is accomplished by increasing or decreasing the length of leg 22 of the bi-metallic element 19. It will also be appreciated that by virtue of the fact that the resistor 30 is in parallel with the circuit which includes the contacts 14 and 15, that arcing there across is minimized. The operation of the system may be adjusted by changing the position of the fixed contact 14 and locking it in the newly adjusted position by means of the lock nut 18.

Figure 3 illustrates the application of the present invention through an arrangement for indicating the battery condition and also for indicating some other variable factor such as the oil pressure. The battery 11 is connected to a resistor 42, which is in series with a plurality of lamps 43 and 44. The battery is also connected directly to another lamp 45. The lamp 43 is connnected to one terminal of a heater winding 46 surrounding one leg of a bi-metallic element 47. The other terminal of the heater winding 46 is connected to ground. The lamp 43 is also connected to an electric contact 48 which is carried by the bi-metallic element 47. The heater winding 46 at an intermediate point is provided with a tap, which is connected to an electric contact 49, carried by and suitably insulated from the leg of the bi-metallic element 47 which carries the heater winding 46. This circuit is so designed that at the normal fully charged battery voltage the lamp 43 will be lighted continuously.

The lamp 44 which indicates an overcharge condition or excessive generator voltage is connected in series with another resistor 51, which in turn is connected to an adjustable stationary contact 52, arranged for cooperation with the movable contact 49 of the bi-metallic element 47. When excessive voltage is applied to the circuit including lamp 43, excessive heat is developed by the heater element 46 which causes the bi-metallic element 47 to move upwardly to close the contacts 49 and 52. This places a shunt circuit around the lamp 43 so that the lamp 44 may be lighted as long or as often as the contacts 52 and 49 touch each other. Due to the principal heating current flowing through only a part of the heater element 46, a relatively small excess voltage will produce intermittent illumination of the lamp 44. The lamp 44 is so selected as to operate at its normal or maximum brilliancy at the voltage supplied to that circuit when it is in parallel with the lamp circuit 43. The lamp 43, however, is arranged to operate at a different voltage and when a circuit is in shunt therewith its brilliancy will be greatly reduced.

When the voltage supplied to the circuit including lamp 43 drops below a certain amount, the heating element 46 provides insufficient heat so that the contact 48 moves into engagement with another adjustable stationary contact 53, which is connected to the lamp 45. At a relatively small amount of under-voltage the parallel circuit provided by the lamp 45 will supply additional energy to the heater 46, so as to bring about a periodic interruption of contacts 53 and 48. If, however, the voltage is considerably lower than that, the contacts 48 and 53 will remain closed, thereby causing the lamp 45 to remain illuminated. The lamp 45 is so arranged so as to operate at normal brilliancy at a voltage considerably below the voltage necessary for the illumination of the lamp 43.

If desired, a circuit for the lamp 45 may include an electric heater 54, which surrounds a bi-metallic element 55. The bi-metallic element carries an electric contact connected to batteries 11 which cooperates with another electric contact to energize a signal or buzzer 56.

The average driver is unfamiliar with the technical operation of an automobile and pays little attention to the various instruments on the dashboard, however, an intermittent flashing light signal or one of a different color is certain to command attention. The normal indicating lamp 43 might be green whereas the low voltage lamp 45 might be red, with the high voltage lamp 44 of an amber color. The red signal light begins to flash slowly when the battery voltage begins to approach the lower voltage level and flashes at increasing rate as the battery voltage continues to drop. At the danger point of low voltage, the lamp 45 glows steadily. The amber light, 44 begins to flash slowly when excessive voltage is being applied to the battery and flashes at an increasing rate as the battery voltage continues to rise.

An ammeter does not indicate battery conditions, but merely shows the rate of charge so that for a fully charged battery, the voltage regulator should decrease the charging current to a safe value. If the voltage regulator is not operating properly, excessive charging of the battery will raise the battery temperature to a dangerous level, evaporate the battery water, and possibly produce burning out of some of the accessories and lights of the automobile.

While it is highly desirable to provide an improved means for indicating normal and abnormal operating conditions of the batteries and generators, it likewise might be desirable to provide a signal lamp indication of normal and abnormal operation of other variable factors commonly indicated by meters on the dashboard of an automobile. To illustrate how this may be accomplished, Figure 3 shows the application of the invention to means for indicating normal and abnormal oil pressure. A similar arrangement could be applied to a temperature indicator or other indication means if desirable. For this purpose there is provided a normal indicating lamp 58 connected in series with the resistor 59, having its terminal connected to a temperature compensated bi-metallic element 61. One leg of the temperature compensated bi-metallic element 61 carries a heater winding 62, having one terminal connected to ground and to the bi-metallic element 61. Thus a complete circuit is provided for illumination of the normal indicating lamp 58. The heating element 62 is connected through a resistor 63 to a movable contact of bi-metallic element 64 and to one terminal of the heater element 65 carried by the bi-metallic element 64. The remaining terminal of the heating element 65 is connected to one side of the storage battery 11. The bi-metallic element 64 is mounted so as to be moved by a pressure diaphragm 66 which is responsive to the oil pressure. The bi-metallic element 64 when used for indicating other variable factors, is actuated by whatever means may be responsive to the condition to be indicated. Connected in parallel with resistor 63, is another resistor 67 and electrical contacts 68 and 69. The contact 69 is carried by one leg of the bi-metallic element 64. The contact 68 is an adjustable stationary contact.

Another indicating lamp 71 is connected between the battery 11 and the heater winding 72 carried by one leg of the bimetallic element 61. The other terminal of the heater winding 72 is connected to an adjustable contact 73, arranged for cooperation with a movable contact 74. The contact 74 is connected to the bi-metallic element 61, which in turn is connected to ground.

Under normal oil pressure conditions, the diaphragm 66 will move the bi-metallic element 64 upwardly so as to close the contacts 68 and 69. The closing of the contacts 68 and 69 decreases the resistance path in series with the heating element 65 thereby to increase the current flow therethrough. This causes one leg of the bi-metallic element 64 to move in a direction tending to open the contacts 68 and 69, thereby to produce an intermittent operation which modulates the total current flowing through the heating elements 65 and 62. The current flowing through the heating element 62 is sufficient to maintain the contacts 73 and 74 in open circuit condition. When the current supplied to heating element 62 is sufficient to maintain separation of the contacts 73 and 74, current will not flow through the lamp 71 and the heating element 72. The heating element 72 supplies additional heat energy tending to open the contacts 73 and 74 thereby during the initial period of low oil pressure, the lamp 71 will flash. From the foregoing it is plain that an arrangement of signal lights is conveniently provided.

While for the purpose of illustrating and describing the present invention certain preferred embodiments have been illustrated in the drawing, it is to be understood that the present invention is not to be limited thereby since such circuit variations are contemplated as may be commensurate with the spirit and scope of the invention as defined in the accompanying claims.

What I desire to protect by United States Letters Patent is claimed as follows:

1. A source of variable voltage in combination with a circuit connected there across including a heating element, an ambient temperature compensated bi-metallic element associated with said heating element, a pair of electric contacts controlled by said bi-metallic element, and a second circuit connected across said voltage source including a resistor, said contacts and said heating element, and an output circuit connected across said heating element.

2. The combination comprising a source of variable direct current voltage, a circuit connected across said voltage source including a resistor in series with a heating element, an ambient temperature compensated bi-metallic element associated with said heating element, a pair of electric contacts controlled by said bi-metallic element, and a second circuit connected across said voltage source including a resistor, said contacts and said heating element, and an output circuit connected across said heating element.

3. The combination comprising a source of variable voltage and a circuit for producing a relatively constant mean effective voltage output, said circuit including a heater mounted on a bi-metallic element, a resistor connected in series between said heater and said source of voltage, an output circuit connected across said heater, a pair of contacts controlled by said bi-metallic element, and a resistor connected in series with said contacts and in parallel to said first resistor.

4. The combination comprising a source of variable voltage and a circuit for producing a relatively constant mean effective voltage output, said circuit including a heater mounted on an ambient temperature compensated bi-metallic element, an impedance connected in series between said heater and said source of voltage, an output circuit connected across said heater, a pair of electrical contacts controlled by said bi-metallic elements, and an impedance connected in series with said contacts and in parallel to said first impedance.

References Cited in the file of this patent

UNITED STATES PATENTS

| | | |
|---|---|---|
| 393,132 | Wagner | Nov. 20, 1888 |
| 1,398,064 | Buchenberg | Nov. 22, 1921 |
| 1,401,049 | Conklin | Dec. 20, 1921 |
| 1,468,006 | Doman | Sept. 18, 1923 |
| 1,492,450 | Gregory | Apr. 29, 1924 |

(Other references on following page)

UNITED STATES PATENTS

| | | | |
|---|---|---|---|
| 1,539,465 | Chandeysson | May 26, | 1925 |
| 1,914,215 | Price | July 13, | 1933 |
| 2,009,601 | Anderson | July 20, | 1935 |
| 2,053,826 | Hallerberg | Sept. 8, | 1936 |
| 2,080,257 | Fitzgerald | May 11, | 1937 |
| 2,181,606 | Parks | Nov. 28, | 1939 |
| 2,203,719 | Crane | June 11, | 1940 |
| 2,205,637 | Smulski | June 25, | 1940 |
| 2,238,071 | Nazar | Apr. 15, | 1941 |
| 2,278,516 | Gulliksen | Apr. 7, | 1942 |
| 2,301,598 | Weyenberg | Nov. 10, | 1942 |
| 2,468,996 | Olson | May 3, | 1949 |
| 2,487,154 | Lloyd | Nov. 8, | 1949 |
| 2,520,899 | Smulski | Aug. 29, | 1950 |

FOREIGN PATENTS

| | | | |
|---|---|---|---|
| 480,391 | Great Britain | Feb. 28, | 1938 |